United States Patent [19]
Haskett

[11] Patent Number: 5,868,164
[45] Date of Patent: Feb. 9, 1999

[54] FLUID CONTROL VALVE SYSTEM WITH COMBINED STEP AND PROPORTIONAL-INTEGRAL CONTROL

[75] Inventor: Diane Haskett, Palm City, Fla.

[73] Assignee: Chlorinators Incorporated, Palm City, Fla.

[21] Appl. No.: 631,416

[22] Filed: Apr. 12, 1996

[51] Int. Cl.$^6$ .................................................. F16K 31/02
[52] U.S. Cl. ........................ 137/624.11; 251/129.01; 251/129.05; 251/129.08
[58] Field of Search ................. 251/129.01, 129.05, 251/129.08; 137/624.11

[56] References Cited

U.S. PATENT DOCUMENTS

| | | |
|---|---|---|
| 3,985,151 | 10/1976 | Smith . |
| 4,741,355 | 5/1988 | Credle, Jr. et al. . |
| 4,790,345 | 12/1988 | Kolchinsky . |
| 4,889,153 | 12/1989 | Zepernick et al. . |
| 5,024,417 | 6/1991 | Voxbrunner .................. 251/129.08 X |
| 5,431,182 | 7/1995 | Brown . |

*Primary Examiner*—Kevin Lee
*Attorney, Agent, or Firm*—Oltman, Flynn & Kubler

[57] ABSTRACT

There is provided a combined step and proportional integral flow control valve system having a fluid control valve for controlling flow of fluid into a water stream, a valve motor in operative engagement with the valve for setting the value, a motor control unit having an output connected to the valve motor, and an input responsive to at least one of a first or a second input signal, and wherein the second input signal is a step signal, and the first input signal is a proportional integral control signal. The water stream is a composite of at least one feed stream, a pump is driving the feed stream wherein the water pump includes apparatus for generating the step signal, indicative of the pump being in one of an on or off state. The control valve system includes a flow meter in the water or waste water stream for generating the proportional integral signal as being proportional with the water flow or volume in the water stream.

16 Claims, 3 Drawing Sheets

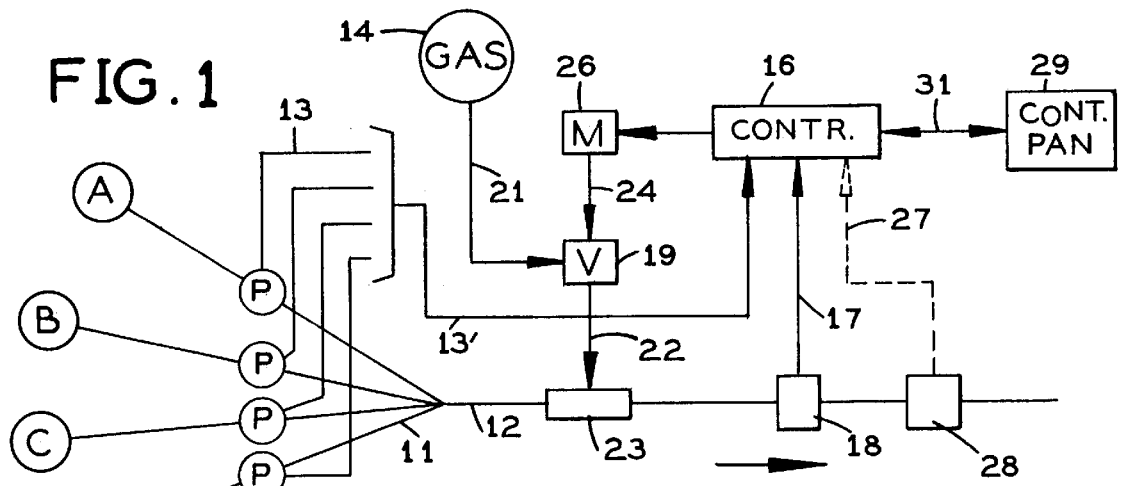
FIG. 1
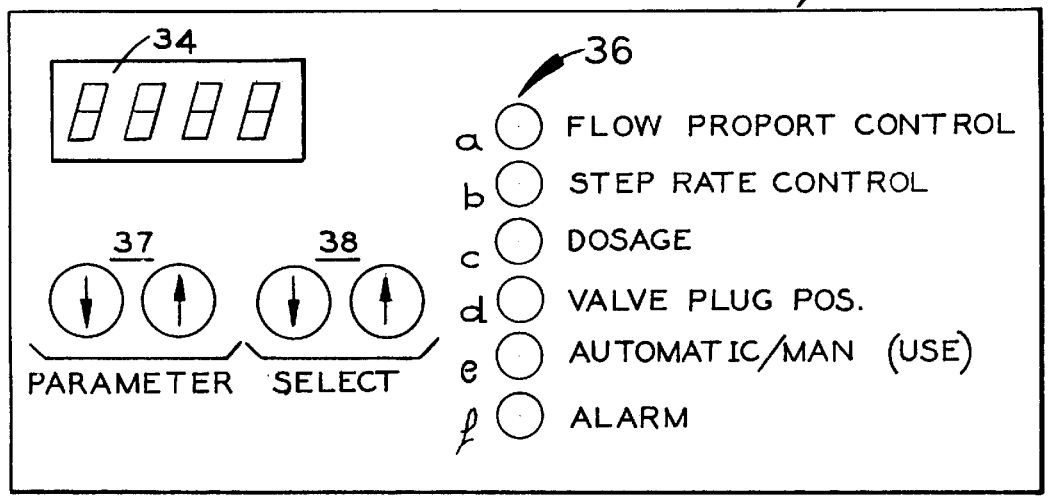
FIG. 3
FIG. 4 ered and a plurality of single point displays, wherein each of the single
FLUID CONTROL VALVE SYSTEM WITH COMBINED STEP AND PROPORTIONAL-INTEGRAL CONTROL The invention relates to a fluid control valve system for controlling injection of chlorinating fluids or the like into water lines, including a control valve being controllable in either proportional integral control mode or in step control mode.

BACKGROUND AND PRIOR ART

In water treatment systems it is well known to inject de-contaminating agents such as for example gaseous chlorine into the water in order to meet certain standards for the purity of the water.

From the prior art it is known to provide automatic flow control for fluids for example by means of a fluid control proportional valve as shown in U.S. Pat. No. 4,790,345. This valve, however, lacks several features required for a water and waste water chlorinating system as disclosed in more detail in the present application.

SUMMARY OF THE INVENTION

The invention is directed to a control system for applying sanitizing agents to a water stream which may be waste water or it could be potable water. The sanitizing agent is most often chlorine gas, but could be other types of gases such as ozone, carbon dioxide, ammonia, sulphur dioxide, fluorine, or it could be a liquid fluid such as, for example, chlorine dissolved in water.

The invention is contemplated to be operating in an environment wherein a single or a plurality of feed streams of water, each driven by a respective pump, converge on a chlorinating system having a chlorine source and a chlorine (i.e. "fluid") control valve which controls the amount of chlorine being ejected into the water stream. The control valve is controlled by a valve motor, which is in turn controlled by a control unit which responds to various inputs. The control inputs may be derived from e.g. a water flow meter in the water stream in a proportional-integral mode. The water or waste water flow meter input may not always be available. If the water or waste water flow meter input is unavailable, the chlorine flow may be derived from on-off input signals derived from the water pump motors. Since it is often known with adequate accuracy how much each water pump contributes as a percentage to the over all water flow, the on-off signals from the various pumps may be used to control the chlorine flow. Use of the on-off signals is in the following called the "step-mode", or "step-signal mode".

It is accordingly an important object of the invention to provide a chlorinating system for water or waste water treatment that is highly dependable and has various operating modes that together insure that the chlorinating system is for all practical purposes capable of treating water or waste water under even severely adverse conditions.

In the control valve system according to the invention, the valve motor is a stepping motor, and the motor pump control output is a stepping signal operative for setting of the control valve.

According to still another feature, the control valve of the motor control unit includes a microprocessor, and a memory connected to the microprocessor, the memory including a data table, the data table including data for correlating settings of the fluid control valve with respective fluid flow values, and wherein the data are adapted to linearize fluid flow values with settings of the control valve.

The control valve system according to the invention may include a manual control panel in operative engagement with the valve motor control unit, the control panel having a data display and a plurality of manual control elements for manually entering control modes into the control unit, wherein further the display includes a digital display, and a plurality of single point displays, wherein each of the single point displays is operative for displaying at least one of the control modes: flow proportional control, step rate control, dosage of fluid, valve plug position, auto/manual state, and alarm state.

In the control valve system according to the invention, the manual control elements may include a control element for scrolling the display to a selected one of the control modes, and a control element for scrolling the control to a control parameter.

In the control valve system according to the invention, the valve can include a valve plug axially receivable in a valve aperture, and a valve setting indicator coupled to the valve plug for visually indicating the setting of the valve, and it can further include mechanical linkage apparatus between the motor and the valve, and manual rotating apparatus connected to the motor for manually setting the valve, such as, for example, a knurled knob in the linkage for manually setting the flow of fluid.

In the control valve system according to the invention, the fluid may be a gas selected from a group of gases consisting of chlorine, ammonia, carbon dioxide, sulphur dioxide, fluorine, ozone and other gases.

The control valve system according to the invention may include speed and torque control apparatus in the control unit, operative for controlling speed of setting the valve, and fluid flow metering apparatus in operative engagement with the control unit for metering fluid flow in the valve.

The control valve system according to the invention may additionally include a "no fluid flow" alarm coupled to the fluid flow metering apparatus, and/or a fluid content sensor in the water stream, and an output from the fluid content sensor, also known as a residual analyzer, connected to the control unit for influencing settings of the control unit.

Further objects and advantages of this invention will be apparent from the following detailed description of a presently preferred embodiment which is illustrated schematically in the accompanying drawings.

BRIEF DESCRIPTION OF THE DRAWINGS

FIG. 1 is an overall block diagram of a water treatment system controlled by the control valve system according to the invention;

FIG. 3 is a block diagram of the major motor control elements of the invention;

FIG. 4 is a plan view of the control panel for the control unit;

Figure 2:
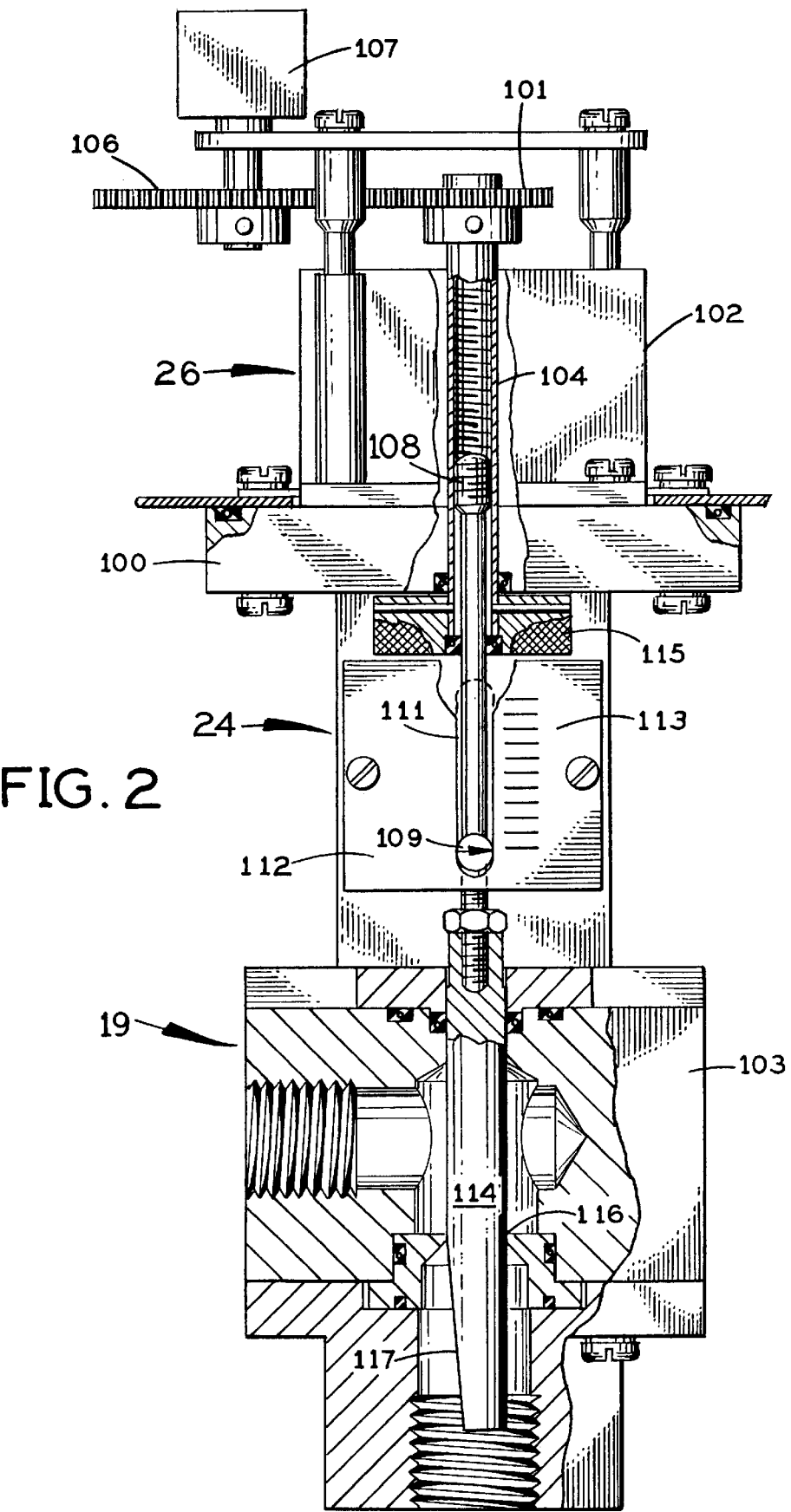
FIG. 2 is an elevational view of the fluid control valve with its various parts.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DESCRIPTION OF THE PREFERRED EMBODIMENTS

In FIG. 1 a plurality of sources of water A, B, C and D are each connected to a respective pump P, the outputs of which are converging as feed streams 11 on a water line 12, wherein the water requires treatment with a sanitizing fluid, e.g. gaseous chlorine from a chlorine source 14. Each pump P is driver by a pump motor, not shown, with a pump motor control which generates an on-off signal, also called a step-signal, on a respective step signal line 13 connected as inputs 13' to a chlorine valve control unit 16, which in one of its preferred embodiments is configured as a micro computer. The control unit 16 has another input 17 from a water flow meter 18 positioned in the water stream 12. The water flow meter 18 generates a proportional integral signal, proportional with the water flow, e.g. in gallons/minute or the like. A fluid control valve 19 has a fluid input port 21 connected to the chlorine gas source 14. The fluid control valve 19 has a fluid output port 22 connected to a gas ejector 23 connected with the water line 12 and serving to eject the sanitizing fluid into the water stream 12.

Normally the step mode control or the integral proportional mode is not available simultaneously, but is selected during the initialization of the system.

The fluid control valve 19 has a drive linkage 24 connected to valve motor 26, advantageously in the form of a conventional stepping motor, but can be of any construction suitable to be driven by an electronic control to defined settings.

The motor control unit 16 has a further input 27, shown in phantom line, derived from a chlorine sensor 28, which optionally can operate to set the fluid valve 19 to provide prescribed concentrations of free chlorine residual in the water flow 12.

A control panel 29 is connected via connection 31 to control unit 16 to enable a human operator to monitor and control the chlorinating system, as described in more detail below.

FIG. 2 shows the fluid control valve assembly with the valve motor 26, the fluid valve 19 and the linkage 24 coupling the valve motor to the valve. The details of the motor and valve assembly are shown in FIG. 2 with reference numerals beginning with number 100.

In FIG. 2 a yoke 100 connects the valve motor housing 102 with the valve body 103, which contains the valve 19. A motor shaft 104 has a drive gear wheel 101 coupled to a driven gear wheel 106, coupled to a potentiometer 107. The motor shaft 104 extends downward in a threaded lead screw 108, threadedly received in inward facing threads in the motor shaft 104. The lead screw 108 has an indicator screw 109 radially extending into a vertical slot 111 in an indicator plate 112. A vertical scale 113 on the indicator plate 112 is aligned with the slot 111 and the screw 109 to visually indicate the vertical position of a valve plug 114 in the valve body 103. The valve plug 114 is vertically slidable in a valve aperture 116 and has a slanted flat 117 which allows the valve to control the flow of gas through the aperture 116 in dependence on the vertical position of the valve plug 114.

A knurled knob 115 is attached to the motor shaft 104, and allows an operator to manually adjust the valve plug 114 to set the flow of fluid in case of failure of the automatic control.

The potentiometer 107 is a multi-turn potentiometer having a potentiometer arm 108a, as shown in FIG. 3, which slides along a resistor 100 in synchronism with the turning of the valve motor 26 and with the vertical valve plug 114. The potentiometer arm 108a receives a positive potential which is in proportion to the valve plug position, and is connected via an A/D converter 31 to an input of a microcomputer 16a which is part of the control 16. In this manner each position of the valve plug is identified by a corresponding digital output of the A/D converter 31, thereby enabling the microcomputer 16 to set the valve plug 114 to any vertical position identified by a corresponding position number by turning the motor 26 in either direction via motor interface 32 and output 30, in well-known manner. The motor 26 is coupled by mechanical linkage shown as phantom line 33 to both the potentiometer arm 108a and the valve plug 114.

A control panel 29 seen in FIG. 1 and 4 has a digital display 34 of conventional construction, and six single-point indicator lights 36a,b,c,d,e, and *f*, and two sets of control keys 37, 38, of which each set has an up and a down key respectively labeled "parameter" and "select." The parameter keys 37 are used to select any one of six control programs corresponding to a label shown next to each indicator light 36 by scrolling the indicator lights 36 to a respective program.

The programs are (a) flow proportional control, (b) step rate control, (c) dosage, (d) valve plug position, (e) automatic/manual use, and (f) alarm.

The select keys 38 are used to insert a parameter, such as dosage, valve plug position and step rate percentages, for any selected program a–f.

Program (a) is used to select the "flow proportional control" mode, for controlling the rate of speed and torque of the motor 26, which is used in the proportional/integral mode in order to accommodate the time difference of the water flow between the chlorine ejector 23 and the flow meter 18; Program (b), selects the step mode of operation, wherein a percentage of the total water flow is inserted for each water source A, B, C and D (FIG. 1); Program (c) is used to set the dosage of chlorine to be applied to the water flow, e.g. in grams of chlorine to a water flow of 100%; program (d) is used to set the valve plug to a selected vertical position; program (e) is used to select automatic or manual operation; and in program (f) light f is automatically turned on if the flow of water being treated falls below an adjustable (preset) limit.

Figure 5:
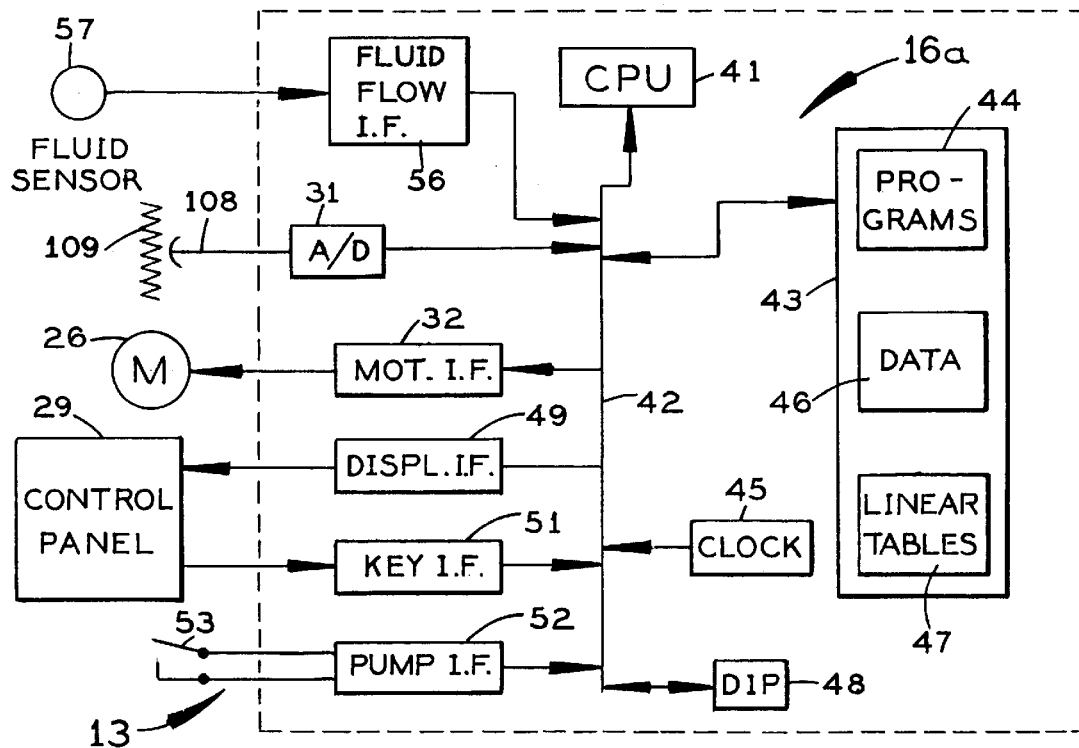
FIG. 5 is a block diagram of the control unit with the microprocessor and its various parts.

FIG. 5 is a block diagram of the microprocessor 16a, wherein a central processing unit CPU 41 is connected via a data bus 42 to a memory 43, which includes a program section 44 for the operating programs, a data section 46, and linearity tables 47. The linearity tables provide corrections for any non-linearity between the fluid valve 19 settings and the actual fluid flow to the chlorine ejector 23. A DIP switch 48 provides initial parameter settings for the control system. The A/D (analog-to-digital) converter 31 converts analog position valve settings to digital position data. The valve motor interface 32 provides drive stepping signals or pulses for the stepping motor 26, the display interface 49 provides drive signals for the display lights 34 and lights 36a,b,c,d,e and *f* in the control panel 29.

The key interface 51 encodes key signals from keys 37, 38 to a format recognized by the CPU 41; and the pump interface 52 detects and encodes a contact closure signal for pump contacts 53 to indicate on/off condition of the pump motor.

A clock 45 is connected via computer bus 42 to supply clock pulses as required for the CPU 41 to drive the microcomputer 16a, and to furnish timing for setting the rate of speed of adjustment of the valve motor 26.

Figure 6:
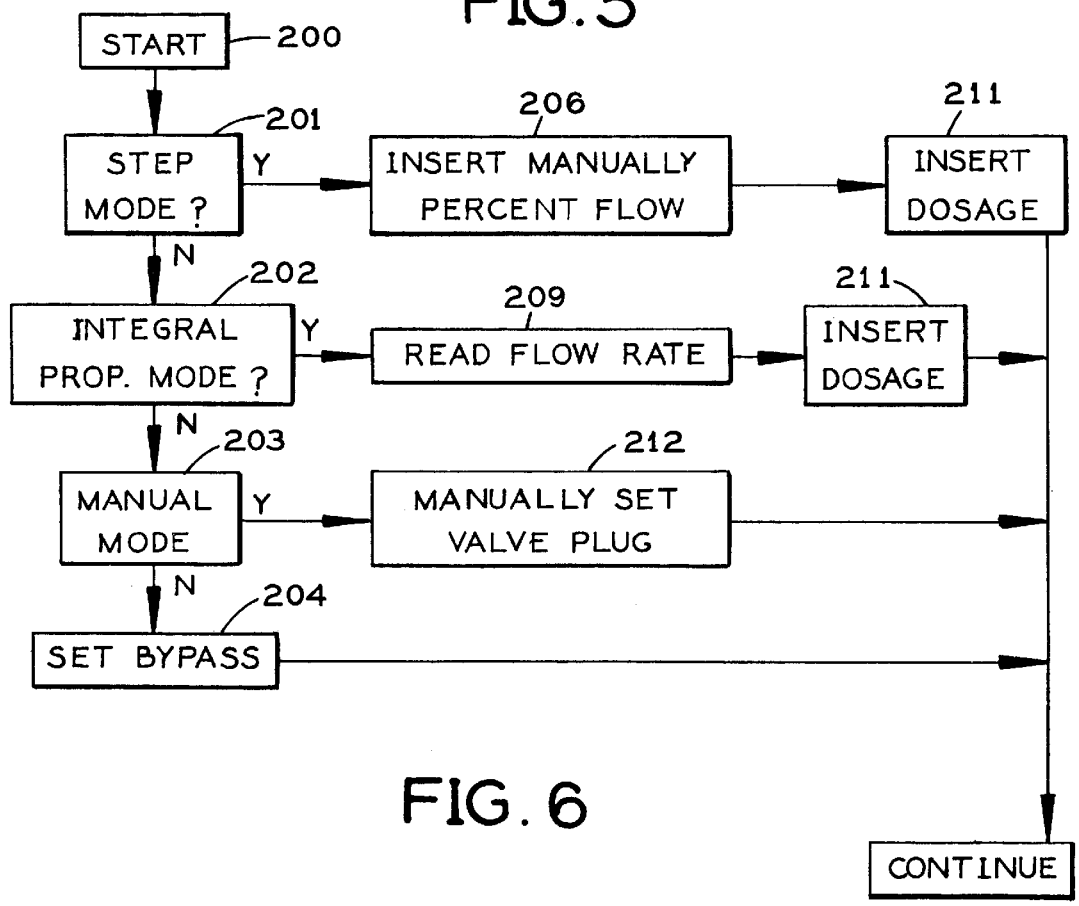
FIG. 6 is a flowchart of the control process.

FIG. 6 is a simplified flow chart for the control system. Beginning with Start 200, an operating mode is selected in one of Step 201, selecting step mode; Step 202, selecting integral/proportional mode; and Step 203, selecting manual mode and step 204 selecting a chlorine bypass mode. If Step mode 201 is selected the percentage of flow for each feed stream A, B, C, D, etc. is inserted in Step 206. If the integral proportional mode is selected (Step 202) the water flow as a percentage is read by flow meter 23, Step 209, and if manual mode is selected in Step 203, the valve position can be entered at control panel 29, or set manually at the knurled knob 115. For each mode gas flow is monitored at Step 207. If no gas flow can be established, a gas by-pass, bypassing gas valve 19, can be arranged as shown in Step 204. In the integral/proportional mode 202, after water flow is read in step 209 chlorine dosage is inserted manually at the control panel 29 in Step 211. In the manual mode, the gas flow is set manually in step 212.

I claim:

1. A combined step and proportional integral fluid flow control valve system comprising a fluid control valve for controlling flow of fluid into a water stream, a valve motor in operative engagement with the valve for setting the valve, a valve motor control unit having a motor control output connected to the valve motor, and a motor control input, the motor being responsive to at least one of a first and a second motor control input signal, and wherein the first motor control input signal is a step signal, and the second motor control input signal is a proportional integral control signal.

2. A control valve system according to claim 1, wherein said water stream is a composite of at least one feed stream, and a water pump driving said feed stream, and wherein said water pump includes means for generating said step signal, indicative of said water pump being in one of an on and off state.

3. A control valve system according to claim 2, including a water flow meter in said water stream for generating said proportional integral signal being proportional with the water flow in said water stream.

4. A control valve system according to claim 1, wherein said valve motor is a stepping motor, and wherein said motor control output is a stepping signal operative for setting of said control valve.

5. A control valve system according to claim 1, wherein said motor control unit includes a microprocessor, and a memory connected to said microprocessor, said memory including a data table, said data table including data correlating settings of said fluid control valve with respective fluid flow values.

6. A control valve system according to claim 5, wherein said data are adapted to linearize fluid flow with respective settings of said valve.

7. A control valve system according to claim 1, including a manual control panel in operative engagement with said valve motor control unit, said control panel having a data display and a plurality of manual control elements for manually entering control modes into said control unit.

8. A control valve system according to claim 7, wherein said display includes a digital display, and a plurality of single point displays, wherein each of said single point displays is operative for displaying at least one of a plurality of control mode consisting of: flow proportional control, step control, dosage of fluid, valve plug position, auto/manual state, and alarm state.

9. A control valve system according to claim 8, wherein said manual control elements include a control element for scrolling said display to a selected one of said control modes, and a further control element for scrolling said control to a control parameter displayed on said digital display.

10. A control valve system according to claim 1, wherein said fluid control valve includes a valve plug axially receivable in a valve aperture.

11. A control valve system according to claim 10, including a valve setting indicator coupled to said valve plug for visually indicating the setting of said valve.

12. A control system according to claim 1, including mechanical linkage means between said valve motor and said valve, and manual rotating means connected to said motor for manually setting said valve.

13. A control system according to claim 12, wherein said manual rotating means include a knurled knob in said linkage for manually setting said flow of fluid.

14. A control valve system according to claim 1, wherein said fluid is a gas selected from a group of gases consisting of chlorine, ammonia, carbon dioxide, sulphur dioxide, fluorine and ozone.

15. A control valve system according to claim 1, including speed rate control means in said control unit, operative for controlling one or both of speed rate and torque of said valve.

16. A control valve system according to claim 1, including fluid flow metering means in operative engagement with said control unit for metering fluid flow in said valve.

* * * * *